May 23, 1933.   C. W. TYDEMAN   1,910,659
ABRASIVE REAMER
Original Filed Aug. 6, 1928   2 Sheets-Sheet 1
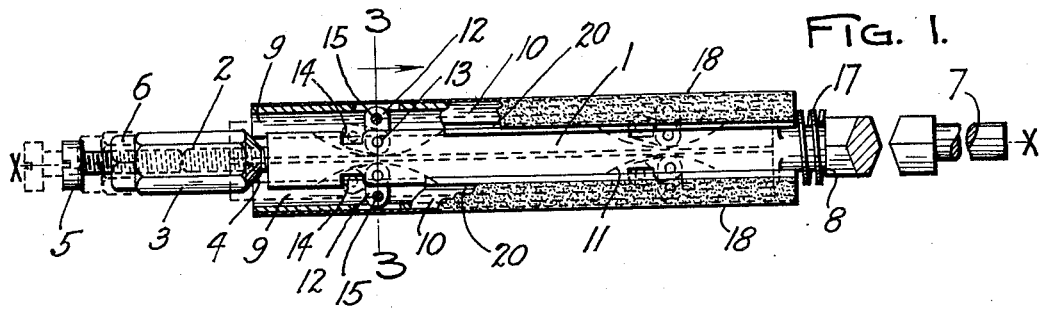
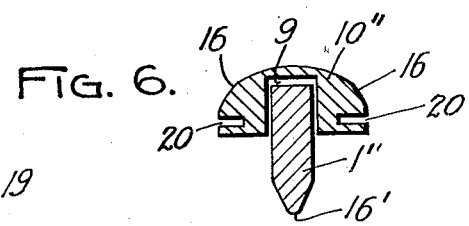
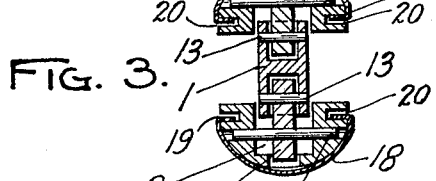
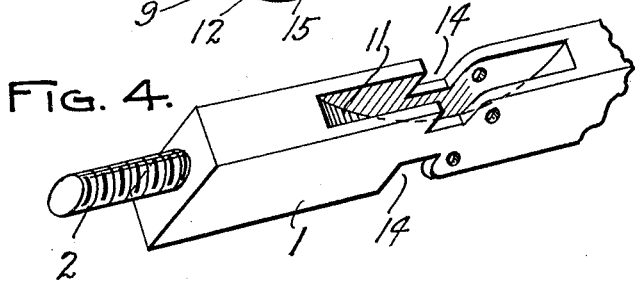
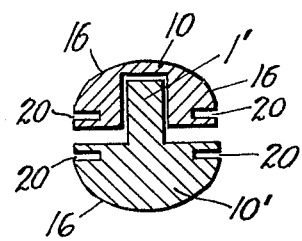
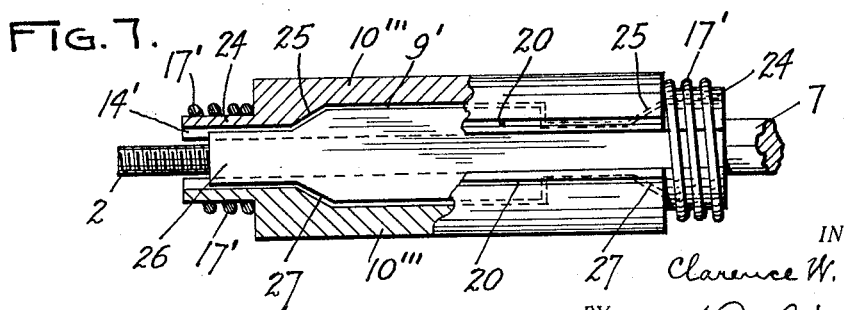
INVENTOR.
Clarence W. Tydeman
BY
J. O'Brien
ATTORNEY.

May 23, 1933.　　　　C. W. TYDEMAN　　　　1,910,659

ABRASIVE REAMER

Original Filed Aug. 6, 1928　　　2 Sheets-Sheet 2

INVENTOR.
Clarence W. Tydeman
BY
A. J. O'Brien
ATTORNEY.

Patented May 23, 1933

1,910,659

UNITED STATES PATENT OFFICE

CLARENCE W. TYDEMAN, OF ENGLEWOOD, COLORADO, ASSIGNOR, BY MESNE ASSIGNMENTS, TO A. OBERHOLTZ, JR., OF DENVER, COLORADO

ABRASIVE REAMER

Refiled for abandoned application Serial No. 297,603, filed August 6, 1928. This application filed December 18, 1931. Serial No. 581,983.

My invention relates to devices for finishing to exact size the inner surfaces of round holes such as the wrist pin holes of engine pistons, and more especially to such devices in which the cutting is done by an abrasive instead of by cutting edges.

My device will be described for the sake of clearness, as used in fitting wrist pin holes of engine pistons, though it will, of course, be understood that this is not intended to limit its field to this use.

The adoption of the alloy piston, and the extreme speed and power requirements of present internal combustion engines, make the fit of the wrist pin in the piston a matter of great importance.

If the fit is too free, there will be knocking when the engine gets up to running temperature, and the resulting expansion of the wrist pin bosses of the piston takes place.

If the fit is too tight, there is danger of scoring and freezing, with possible damage or even wreck of the engine.

Experience has shown what is required in such fits and tolerances in order to give perfect satisfaction and the greatest amount of service before knocks begin as the result of wear.

As an illustration, should a wrist pin which actually measures .750″ be secured in an alloy piston with the wrist in bearing in this case in the upper end of the connecting rod, a tolerance of two tenths of a thousandth of an inch is all that is permissible.

This means that the smallest hole in the piston can be .7498″, and the largest hole can be .7502″.

A similar wrist pin having a bearing in the piston bosses instead of in the connecting rod, should have a maximum clearance of four-tenths of a thousandth of an inch, if a tolerance of two-tenths of a thousandth is to be permitted.

That is, the largest hole can be .7504″ and the smallest hole can be .7500″.

It will be seen from the above that the fit of the wrist pin in the piston is not only an important but a difficult matter, because of the extreme precision required in the workmanship.

In addition to the above points, the size of the ordinary wrist pin as manufactured varies plus or minus a thousandth of an inch from the nominal size, though some of them vary even more than this.

This means that a wrist pin with a nominal diameter or .750″ may be anything from .749″ to .751″.

In factory production this is taken care of by measuring and classifying the pistons by the diameter of their wrist pin holes and storing the different classifications separately.

The wrist pins are also classified and stored separately by their actual diameters, so that proper fits between pistons and wrist pins may be obtained by proper selection.

But the garage or repair shop is seldom able to do this, and as a result, individual fits are generally required.

In some cases the wrist pin is reground to the exact required size; in others and the majority of cases, the piston is reamed.

But, a little study of the above statements will show that for exact results the reamer method requires either a great many reamers which differ from each other in size by but a fraction of a thousandth of an inch for each nominal wrist pin size, or a complete set of adjustable reamers. Both of these alternatives require considerable investment in reamers, and also considerable cost and annoyance in refinishing the reamers frequently to keep them sharp and up to size.

And, if adjustable reamers are used, it is very easy to set a reamer too large and spoil the work by making an oversize hole.

It has been found that honing and polishing the walls of engine cylinders results in longer life to the engine, not only because the cylinders have then a smooth surface with no minute irregularities which would wear off faster than would an entire surface, but also because such a polished cylinder surface tends to wear the surface of the piston much slower.

This kind of honed or polished finish, however, has never been properly applied to the wrist pin holes of pistons, or other small diameter holes.

The object of this invention is to provide an abrasive tool which will do the work of a reamer.

A further object is to provide such a tool which is easily adjustable to the finest variations in size over a considerable range.

A further object is to provide such a tool which will produce a parallel hole of the finest finish, similar to a honed or polished surface.

A further object is to provide such a tool with an adjustable maximum stop, which may be set for a desired size, to prevent the tool being adjusted to exceed that size in the next hole finished.

A further object is to provide such a tool which will not only do the most precise work, but which is adjustable for a wider range of hole sizes than is possible with adjustable reamers.

A further object is to produce such a tool in which the contact upon the abrasive shifts with variation in the adjustment of the tool diameter.

A further object is to produce such a tool in which the abrasive may be easily and quickly replaced at a minimum of cost.

A further object is to produce such a tool which, because of its many features, will provide a solution to the problem of fine finishing of holes in metal from the standpoints of results obtained, cost and time required.

I attain the above objects by providing a tool having one or more hone shoes with longitudinal contact surfaces and means to vary the radius of such surfaces from the axis of the tool while maintaining them parallel with the axis, the shoes having removable hone or abrasive members.

The construction will be clearly seen in the drawings, in which:

Fig. 1 is a side elevation in partial section of my device adjusted to the large position, with the small position indicated by dotted lines;

Fig. 3 is an enlarged section on the line 3—3, Fig. 1;

Fig. 4 is a perspective view of part of the body;

Fig. 5 is a section of a modified form of my device;

Fig. 6 is a section of another modified form of my device;

Fig. 7 is a fragmentary elevation in partial section of another form of my device;

Figure 2:
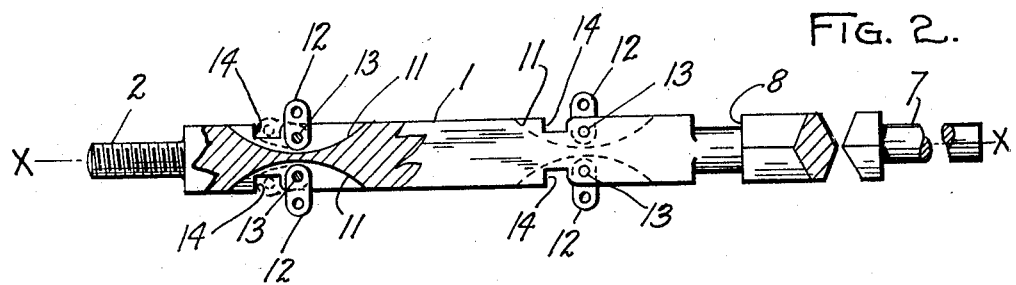
Fig. 2 is an elevation in partial section of the body of my device.
Figure 8:
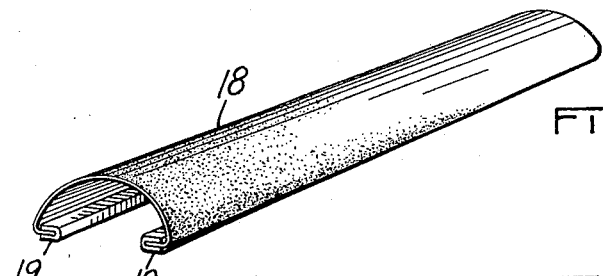
Fig. 8 is a perspective of the hone member.

The body 1 is provided with the threaded adjusting spindle 2, upon which is screwed the adjusting nut 3, having a bevel face 4.

The adjusting lock screw 5 is adapted to screw into the adjusting nut 3, its position therein being locked by the nut 6.

In finishing the holes in a set of pistons, the desired size may be obtained for the first hole by the fit and trial method.

Before removing the tool, the last time from the piston, the adjusting screw 5 is screwed in until it contacts against the end of the spindle 2, and is locked in that position by the lock nut 6.

The adjusting screw 3 is then backed off so the tool may be easily removed from the hole.

When used in the next hole, the adjusting nut 3 may be set up little by little until the adjusting screw 5 contacts against the end of the spindle 2. This insures the second hole being no larger than the first hole. In fact, it will be the same size as the first hole lacking any small amount that may have been worn from the abrasive member.

This setting of the adjustable maximum stop, will therefore allow a mechanic to finish a set of pistons so close to a required set size that it will take only a very short time to make the final individual fits. Thus, the use of the adjustment lock screw 5 will save considerable time on any such set of holes. The body 1 is provided with the shank 7 by which it may be mounted in a tool holder or chuck, and is also provided with the shoulder 8.

The body is finished to form guides adapted to closely fit the channels 9 of the hone shoes 10 upon which the abrasive member is mounted.

The body 1 is also provided with the link recesses 11 to receive the links 12, which are pivotally mounted on the body by the pivot pins 13.

The walls of the recesses 11 are provided with the slots 14 to receive the shoe pins 15 and permit the angular movement of the links as they pivot about the pins 13 until they are nearly parallel with the axis X—X.

The outer ends of the links 12 are pivotally mounted on the hone shoes 10 by the shoe pins 15.

The links 12 are mounted in the body 1 and the hone shoes 10 so as to maintain the contact surfaces 16 of the hone shoes 10 parallel with the axis X—X of the body 1.

That is, the links are of the same length, and the pins 13 are separated in the body 1 by the same distance as separates the pins 15 in the hone shoes 10.

The pins 13 are also positioned equally from the axis X—X and the pins 15 are positioned equally with respect to the contact surfaces 16.

Thus, the links 12 must always be parallel and the contact surfaces 16 are maintained parallel with the axis X—X regardless of the angular position of the links 12.

When set for the small size, as shown by the dotted lines in Fig. 1, the shoes 10 are nearly touching each other and the links are nearly parallel with the axis X—X. The bevel face 4 of the adjusting nut 3 rests in the counterbore provided by the channels 9 in the end faces of the shoes 10, which forces the two shoes to occupy the same longitudinal position along the body 1 and with the links 12 all at the same angle with the axis X—X.

The shoes 10 are held in this position, contacting with the bevel face 4 of the adjusting nut 3 by the reducing spring 17, which bears against the shoulder 8.

The hone members 18 are made of abrasive fabric or other sheet abrasive and are provided with the mounting edges 19.

These mounting edges are to be mounted in the mounting grooves 20 of the shoes 10, and are to be stiff enough to act as locks to hold the hone members solidly in place on the shoes 10.

The hone members 18 are mounted on the shoes by first starting the edges 19 in the grooves 20 and then sliding the hone member lengthwise upon the shoe.

The edges 19 as shown are made of thin narrow metal strips bent double along their length and crimped upon the sheet abrasive.

But any other method of providing the sheet abrasive with locking edges may be used if the result fulfills the requirements and the hone members are thereby firmly held in place on the shoes.

And, though the abrasive members are shown as being provided with two mounting edges, if desired the trailing edge need not be so provided.

But, in such a case, care would have to be taken to always revolve the tool in the work in a direction which would make the mounted edge of the abrasive member the leading edge, as any mechanic will understand.

In the operation of my device, the shoes 10 are spread by the adjustment of the nut 3 until the proper size is obtained, and the tool may then be wrung through the hole by hand in much the same manner as with a reamer, and with either the work or the tool held in a vice or in some other manner.

In case the work is not done by hand, the tool may be mounted in the chuck of a drill press, and reciprocated in the wrist pin hole as it is revolved by the press; or the tool may be merely revolved by the press and reciprocated by hand.

Or, the tool may be mounted in a lathe and revolved, while the piston is reciprocated by hand or by the aid of mechanism on the lathe.

Or, the tool may be mounted in the chuck of an electric drill and the drill mounted in a vice, or otherwise, so that the piston may be reciprocated by hand as the tool is revolved.

Or, the piston may be mounted and held stationary in any suitable manner and the electric drill may be held and reciprocated by hand.

In other words, in any case, the tool and the work are not only revolved, but also moved longitudinally with respect to each other, and obviously it is immaterial whether the tool or the work has the actual movement.

Figure 9:
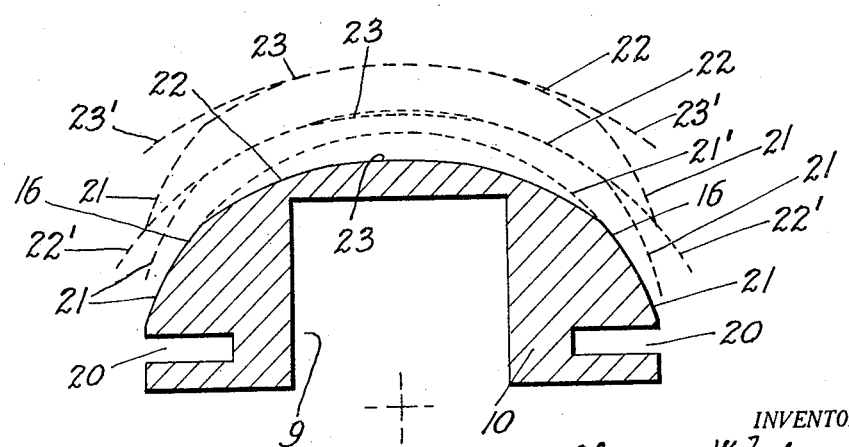
Fig. 9 is an enlarged section of a hone shoe, and showing the generation of its contour and its movement with respect to the axis of the body.

In Fig. 9 it will be seen that when the tool is at the smallest setting, the curve of the contact surface is such that contact will be made along the portion 21, while the other portions of the surface 16 will not contact since they are inside of the arc 21'.

When the adjusting nut 3 has spread the shoes 10 until they are at about the middle point of their spread, as shown by dotted lines, the curve of the contact surface 15 is such that the contact is made along the portions 22, while the other portions of the surface 16 will not contact since they are inside of the arc 22'.

And when the adjustment is set to the maximum size, as shown by dotted lines, the contact surfaces will contact with the hole walls along the portion 23, while the other portions of the surface 16 will not contact since they are inside of the arc 23'.

For clearness in the explanation the curves 21, 22 and 23 are shown abruptly intersecting, but as the tool is made, these intersections are formed to curves so that 21 runs gradually into 22, and 22 runs gradually into 23.

By this curved construction of the contact surfaces, the hone members are worn at different places for different settings and sizes of holes, since the finished curve of the contact surfaces is such that the contact changes progressively from start of the portions 21 to the center of the portion 23 as the set of the tool increases.

Thus, a hone member may be worn out for an $\frac{11}{16}$ inch hole, say, and still be practically new for a $\frac{15}{16}''$ hole.

In the modified form as shown in Fig. 5, one of the hone shoes 10 is made integral with the body 1'.

The single movable shoe 10 is to be mounted upon the body 1' in the same manner as in the construction described above, and is moved longitudinally along the body 1' against the pressure of the spring 17 by the adjusting nut 3 in the same manner.

This is a slightly cheaper construction, and when the tool is to operated by hand, may in some cases be quite satisfactory.

But, since only one hone shoe moves, the axis of rotation of the hone shoes will not always be coincident with the axis of the body 1'.

For this reason the construction is hardly so well adapted for use in a drill press or other power operated device as the construction shown in Fig. 1, but may do very well when operated by hand.

Figure 10:
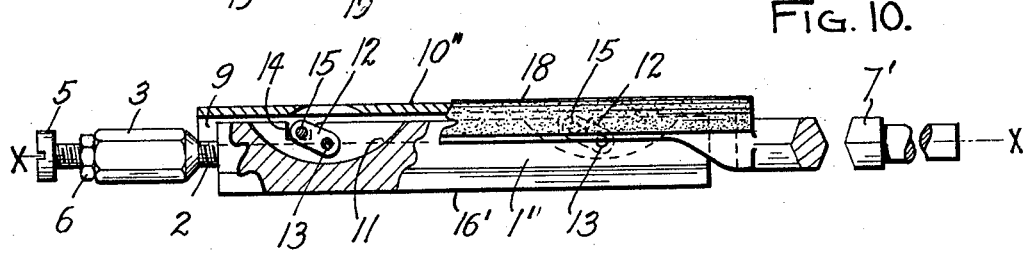
Fig. 10 is a side elevation in partial section of the modified form shown in Fig. 6.

In the modified form shown in Figs. 6 and 10, there is but one movable shoe 10', which is provided with the shank 7'.

The body 1' acts as one hone shoe, but is not provided with a hone or abrasive member, the longitudinal surface 16' acting to rub the honed material of the finished hole surface with something of the same compressive effect of a broach.

This form also is for cheaper constructions and is for hand work probably more than for power operation.

In the form shown in Fig. 7, the hone shoes 10' are held together by reducing springs 17' fitted upon reduced cylindrical portions 24.

The shoes are provided with guide channels 9', the walls thereof being of less height along the portions 14' adjacent the adjusting bevels 25.

The body 26 is finished to form guides to closely fit the channels 9' and the portions 14' and is also provided with the adjusting bevels 27, which are adapted to co-act with the bevels 25 and spread the shoes 10' when the shoes and the body are moved longitudinally with respect to each other, by the adjusting nut 3.

When the adjusting nut 3 is backed off, the springs 17' by their contraction and the action of the bevels 25 and 27, maintain the shoes in contact with the nut 3 and reduce the size of the tool.

The distance between the bevels 27 must be the same as between the bevels 25, so that the shoes will always be parallel with each other and with the axis X—X of the body 26. The pitch or angle of all bevels must also be the same. It will now be seen that the above constructions attain the objects sought.

Though the tool cuts by abrasion, it performs the work of a reamer; is easily adjustable to the finest variation over a considerable range; will produce a parallel hole having polished or honed surfaces; has a wider range of adjustment than is possible with adjustable reamers; the wear on the abrasive members changes with variation in the diameter of the hole reamed; the abrasive member is easily and quickly replaced, and is very cheap; and as a result of all the features of the tool, the finest kind of work can be done at a low cost and in a very short time.

I am well aware that there are various alterations in construction which will appear to any competent mechanic once he is familiar with my device, and which will not depart from the essence of my invention, and that different combinations of the various parts might be made from the different forms I have shown; so I do not wish to limit my protection narrowly to any one form of construction.

This application is a refiling of application Serial No. 297,603, filed August 6, 1928.

Having described the invention what is claimed as new is:

1. In an expansible abrasive reamer having abrasive supporting members provided with paraller rigid longitudinal surfaces, means for changing the distances between the surfaces, and means for securing an abrasive in place on the supporting members, the abrasive supporting surfaces having a sectional contour whereby the operating diameter shifts along said surfaces angularly as the size of the reamer is varied.

2. In an expansible abrasive reamer having a maximum and a minimum size and a central axis, and parallel longitudinally curved rigid abrasive supporting surfaces, said surfaces being provided with a sectional contour whereby the outermost points of the curved surfaces shift along the contour of said surfaces as the reamer size is varied from maximum to minimum and a sheet of abrasive material secured to each abrasive supporting surface.

3. In an expansible abrasive reamer having a maximum and a minimum size and a central axis and parallel longitudinal rigid curved surfaces and provided with parallel longitudinal mounting slots, said surfaces being provided with a sectional contour whereby the outermost points of the curved surfaces shift along the contour of said surfaces as the reamer size is varied from maximum to minimum, and a sheet abrasive member provided with parallel mounting edges adapted to slide in said slots and thereby securely mount said member upon the reamer in close contact therewith.

4. In an expansible abrasive reamer having parallel rigid longitudinal surfaces and mounting slots and a sectional contour whereby the operating diameter of the reamer shifts along said surfaces angularly as the reamer size is varied, and a sheet abrasive member provided with parallel mounting edges adapted to slide in said slots and thereby securely mount said member upon the reamer in close contact therewith.

5. In an abrasive reamer having a rigid shoe with a longitudinal outer surface terminating in parallel longitudinal slots intersecting said surface, a sheet abrasive member having reinforced parallel mounting edges adapted to slide in said slots with the member in close contact with said surface, whereby in either direction of rotation of the reamer the leading reinforced edge of the sheet abrasive and its slot will act to position the member against the friction of the cutting contact, and the lagging reinforced edge and its slot will act to maintain a snug fit between the sheet abrasive and the said surface.

In testimony whereof I affix my signature.

CLARENCE W. TYDEMAN.